(12) United States Patent
Refael et al.

(10) Patent No.: US 10,348,936 B2
(45) Date of Patent: Jul. 9, 2019

(54) MEASURING COLOR AND CALIBRATING PRINTERS

(71) Applicant: HEWLETT-PACKARD INDIGO B.V., Amstelveen (NL)

(72) Inventors: Sagi Yehonatan Refael, Ness Ziona (IL); Pavel Blinchuk, Ness Ziona (IL); Iliya Shahamov, Ness Ziona (IL)

(73) Assignee: HP Indigo B.V., Amstelveen (NL)

( * ) Notice: Subject to any disclaimer, the term of this patent is extended or adjusted under 35 U.S.C. 154(b) by 22 days.

(21) Appl. No.: 15/541,261

(22) PCT Filed: Jan. 30, 2015

(86) PCT No.: PCT/EP2015/052018
§ 371 (c)(1),
(2) Date: Jun. 30, 2017

(87) PCT Pub. No.: WO2016/119905
PCT Pub. Date: Aug. 4, 2016

(65) Prior Publication Data
US 2017/0374238 A1    Dec. 28, 2017

(51) Int. Cl.
*H04N 1/60*     (2006.01)
*H04N 1/56*     (2006.01)

(52) U.S. Cl.
CPC ......... *H04N 1/6041* (2013.01); *H04N 1/6036* (2013.01); *H04N 1/6044* (2013.01)

(58) Field of Classification Search
None
See application file for complete search history.

(56) References Cited

U.S. PATENT DOCUMENTS

| | | | |
|---|---|---|---|
| 5,673,336 A | 9/1997 | Edgar et al. | |
| 5,777,656 A * | 7/1998 | Henderson | H04N 1/4078 347/251 |
| 6,323,957 B1 | 11/2001 | Ball | |
| 6,400,099 B1 * | 6/2002 | Walker | B41J 2/125 250/552 |
| 6,474,767 B1 * | 11/2002 | Teshigawara | B41J 2/04505 347/19 |

(Continued)

FOREIGN PATENT DOCUMENTS

DE    4303081    8/1993

OTHER PUBLICATIONS

He X., Photonics Spectra (May 2013) Retrieved from https://www.teledynedalsa.com/public/mv/appnotes/Trilinear_cameras_offer_high_speed_.

(Continued)

*Primary Examiner* — Anh-Vinh T Nguyen
(74) *Attorney, Agent, or Firm* — HP Inc. Patent Department

(57) ABSTRACT

Methods of measuring colors, methods of calibrating printers and printing systems for implementing the methods are disclosed. Calibration maps are printed on print media. The calibration maps have intertwined contiguous printed and non-printed areas. One or more color signals are measured on contiguous printed areas. One or more noise signals are measured on non-printed areas that are adjacent to the contiguous printed areas. Clear color signals are generated by removing the one or more measured noise signals from the one or more measured color signals.

20 Claims, 5 Drawing Sheets

(56) References Cited

U.S. PATENT DOCUMENTS

| | | | | |
|---|---|---|---|---|
| 6,623,096 B1* | 9/2003 | Castano | ................ | B41J 2/2135 |
| | | | | 347/19 |
| 7,104,623 B2* | 9/2006 | Samii | ................ | B41J 2/14 |
| | | | | 347/12 |
| 8,534,792 B2 | 9/2013 | Geurts | | |
| 8,649,076 B2 | 2/2014 | Majewicz | | |
| 8,797,589 B2 | 8/2014 | Dalal et al. | | |
| 2003/0063338 A1 | 4/2003 | Gudaitis et al. | | |
| 2007/0064066 A1* | 3/2007 | Piatt | ................ | B41J 2/03 |
| | | | | 347/74 |
| 2010/0272314 A1* | 10/2010 | Cournoyer | ......... | G06K 9/00449 |
| | | | | 382/103 |
| 2011/0292451 A1* | 12/2011 | Harvill | ................ | H04N 1/54 |
| | | | | 358/3.03 |
| 2012/0081578 A1* | 4/2012 | Cote | ................ | G06T 3/4015 |
| | | | | 348/231.99 |
| 2012/0269527 A1* | 10/2012 | Kuo | ................ | G03G 15/043 |
| | | | | 399/49 |
| 2013/0250378 A1* | 9/2013 | Kitai | ................ | H04N 1/00023 |
| | | | | 358/504 |
| 2014/0111836 A1 | 4/2014 | Aharon et al. | | |
| 2014/0139883 A1 | 5/2014 | Hashizume | | |
| 2015/0155937 A1* | 6/2015 | Jeffrey | ................ | H04B 10/116 |
| | | | | 340/815.4 |
| 2015/0155938 A1* | 6/2015 | Jeffrey | ................ | H04B 10/116 |
| | | | | 340/815.4 |
| 2016/0342107 A1* | 11/2016 | Yedid Am | ................ | B41J 2/473 |

OTHER PUBLICATIONS

Inline-Scanner (n.d.) Retrieved from http://www.hecht-electronic.de/en/products/messen/measuring/inline-scanner.html.

QuadTech® Color Control and Web Inspection System with AccuCam™, (n.d.) Retrieved from http://www.quadtechworld.com/en/products/ccs_accu.asp.

* cited by examiner

MEASURING COLOR AND CALIBRATING PRINTERS

CROSS-REFERENCE TO RELATED APPLICATION

This application is a U.S. National Stage Application of and claims priority to International Patent Application No. PCT/EP2015/052018, filed on Jan. 30, 2015, and entitled "MEASURING COLOR AND CALIBRATING PRINTERS."

BACKGROUND

Color calibration is the process to measure and/or adjust the color response of a device (input or output) to a known state. For printers a calibration profile for a printer is created by comparing a test print result, i.e. a calibration element such as a calibration page for two-dimensional (2D) printers or a calibration sample for three-dimensional (3D) printers, using a photometer with an original reference file. Another possibility to generate a calibration profile of a printer is to use a calibrated scanner as the measuring device for the printed test page instead of a photometer. A calibration profile is necessary for each printer/print medium (e.g paper or layer of build material)/print fluid combination. Accurately measuring the color of the printed test page is necessary to properly calibrate the printing color(s) of a print system.

BRIEF DESCRIPTION

Some non-limiting examples of color measurement and calibration methods and systems will be described in the following with reference to the appended drawings, in which.

DETAILED DESCRIPTION

Figure 1:
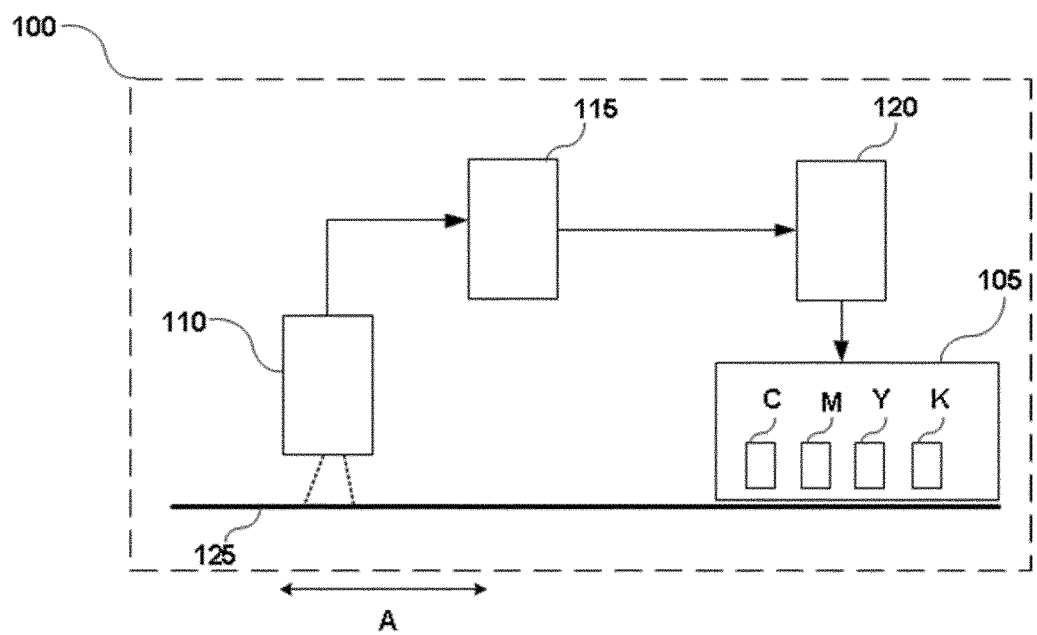
FIG. 1 is a print system according to an implementation.

In some printing systems, a scanner is in-line with the printer. FIG. 1 is a print system according to an implementation. Print system 100 comprises a printing module 105, an in-line image capture assembly (or "in-line scanner") 110, a processing unit 115, and a calibration module 120. The printing module may print a calibration map on a print medium 125 movable along a first path A, based on initial color uniformity instructions received from the calibration module 120. The print system 100 may be a 2D print system or a 3D print system. Accordingly, the printing module may be a 2D or a 3D printing module. In case of a 2D print system it may comprise one or more color components, e.g. one or more ink or toner cartridges, that may be used to print the calibration map. The print medium 125 may then be a 2D print medium, such as paper. In case of a 3D print system the color components may comprise one or more colored printing fluids or agents. In a 3D print system the print medium 125 may be a layer of build material, such as a powdered build material. For example, the printing module 105 may comprise a set of four color components containing cyan (C), magenta (M), yellow (Y) and black (K) color formulations, respectively. The inline scanner 110 may measure one or more color signals on the calibration map. The processing unit 115 may instruct the calibration module 120 to generate new uniformity instructions for the printing module 105 based on the color signals received from the in-line scanner 110 as the print medium 125 moves along first path A.

However, using the in-line scanner 110 of the printing system to measure color may not provide accurate measurements because there is noise attached to the signal. In some printing systems the mechanism is built so that the print media 125, e.g. paper, is transported beneath the in-line scanner 110 and not the in-line scanner 110 over the print media 125. This way the distance of the print medium from the in-line scanner sensor may change within the same scanning process and this change may cause brightness alterations on the scanned image. Furthermore, the calibration of the scanner sometimes may not be optimal or the scanner sensor(s) may not be an appropriate color measuring tool in itself. Therefore, the scanned image may accumulate noise with respect to color measurement, thus rendering the scanned image imprecise to use.

A way to accurately measure color is by building the test print page, or calibration map, and the associated scanning process in a way that color and noise signals may be measured separately but in close proximity.

To achieve this, a calibration map is proposed printed in such a way on a print medium's, e.g. paper's, substrate that color areas, e.g. color lines, are intertwined with substrate areas, e.g. substrate lines. On the color areas the color signal may be measured. On the substrate areas, i.e. before and after or above and below, the noise signal around the color areas may be measured. During a measurement process the print medium's printing process to generate the calibration map may be along a second path B, substantially perpendicular to the first path A that also corresponds to the advancement of the print medium in the printing system, while the measurement process, i.e. the scanning of the calibration map, may be along the first path A. The inline scanner 110 may comprise scanner sensors arranged along the second path B.

Figure 2A:
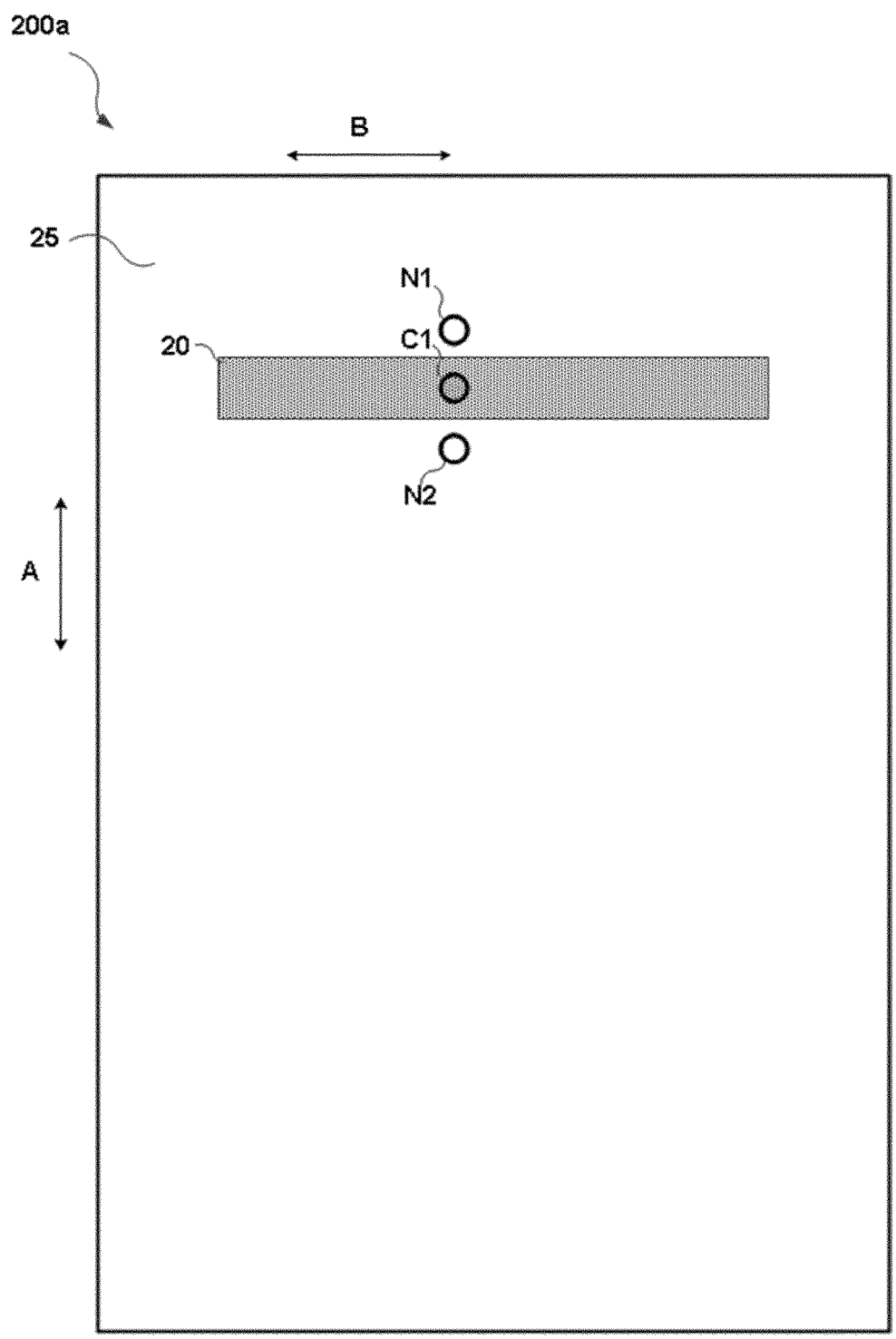
FIG. 2a is an example calibration map.

FIG. 2a is an example calibration map according to an implementation. The example calibration map 200a comprises a contiguous printed area 20 and a non-printed area 25. The contiguous printed area 25 is surrounded by the non-printed area 25. In the example of FIG. 2a it is assumed that the print medium is white and that the contiguous printed area 20 is printed using one reference color. For example, the printed area may be printed using cyan, magenta, yellow or black color. In other implementations the contiguous printed area may be printed using a combination of colors. One or more color measurements may be made on the contiguous printed area 20 of the calibration map 200a and one or more noise measurement on the non-printed area adjacent to (i.e. before and/or after) the contiguous printed area of the calibration map. In the example of FIG. 2a a first noise measurement may be taken at point N1 of the non-printed area 25, at an area above (or before) and adjacent to the contiguous printed area 20, a first color measurement may be taken at point C1 of the contiguous printed area 20 and a second noise measurement may be taken at point N2 of the non-printed area 25, at an area below (or after) and adjacent to the contiguous printed area 20. An average of the noise measurements may be calculated and then a ratio of the average noise value to a reference noise value may be calculated. This ratio may then be multiplied with the first color measurement. The result may be the clear color measurement.

Figure 2B:
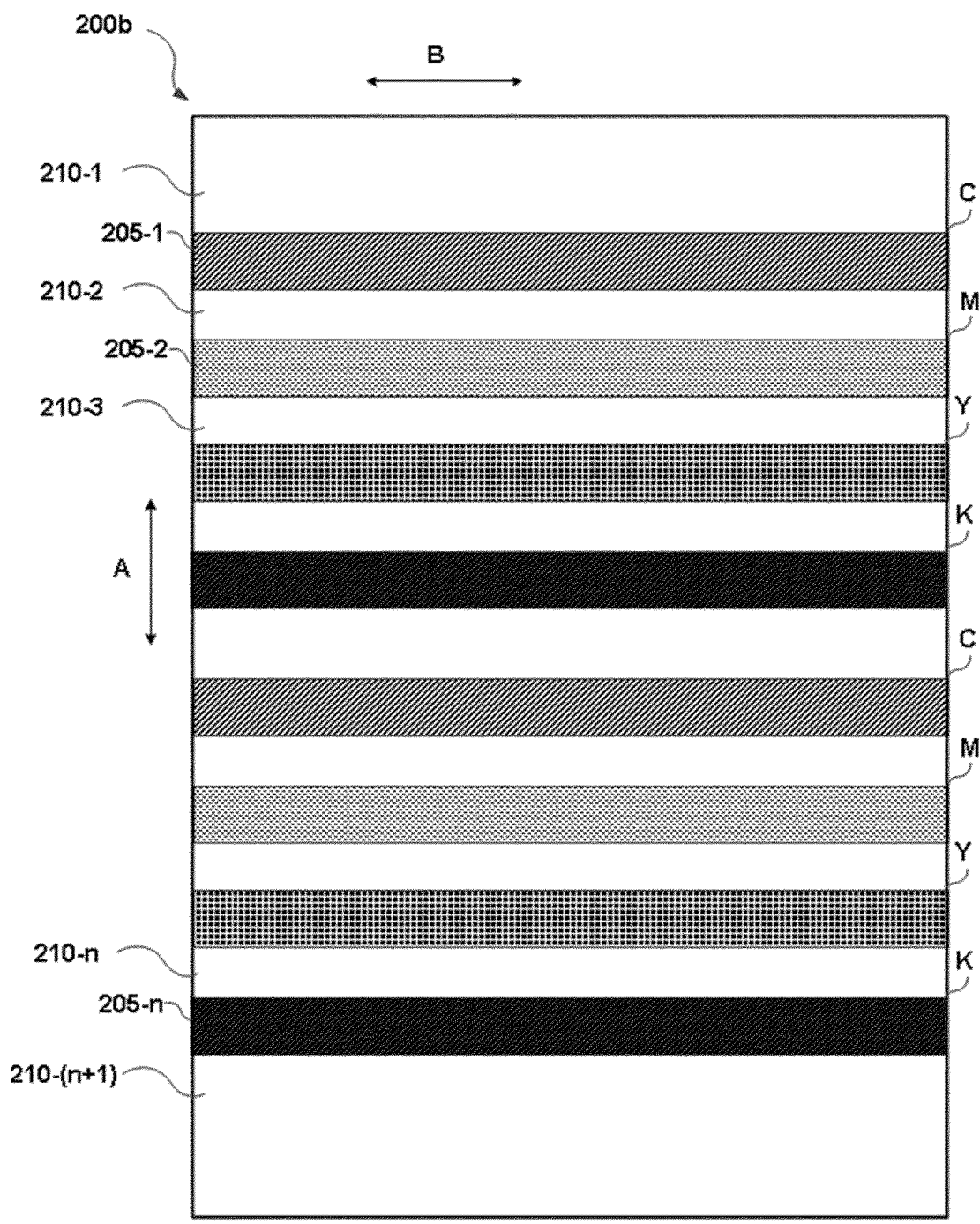
FIG. 2b is another example of a calibration map.

FIG. 2b is an example calibration map according to another implementation. The example calibration map 200b may comprise intertwined contiguous printed and non-printed areas (lines). Areas 205-1, 205-2, 205-n are contiguous printed areas. Areas 210-1, 210-2, 210-3, 210-n are contiguous non-printed (substrate) areas. Each contiguous printed area may be preceded and followed by a contiguous non-printed area. For example, printed area 205-1 is preceded by non-printed area 210-1 and followed by non-printed area 210-2. Accordingly, printed area 205-2 is preceded by non-printed area 210-2 and followed by non-printed area 210-3. Finally, printed area 205-n is preceded by non-printed area 210-n and followed by non-printed area 210-(n+1). In the example of FIG. 2b it is assumed that the print medium is white and that the printed areas are printed using four reference colors. The printed areas may be printed using cyan, magenta, yellow and black color. In other implementations one single color may be used or other combinations of colors. Furthermore, each contiguous printed area may be printed using a combination of colors, provided that each printed area neighbors with at least one non-printed area so that noise measurements may take place in its immediate vicinity.

The inline scanner 110 may measure one or more color signals on the contiguous printed areas of the calibration map and one or more noise signals on the non-printed areas adjacent to (i.e. before and/or after) the contiguous printed area of the calibration map. The same scanner sensor may measure one or more color signals and one or more noise signals associated with said one or more color signals along the second path B. The various scanner sensors of the in-line scanner may therefore generate sets of color and noise signals associated with their scanning line. During a measurement and/or calibration process, the processing unit 115 may receive the sets of one or more color signals and the one or more noise signals and generate one or more clear color signals by removing the one or more measured noise signals from the one or more measured color signals, respectively. The calibration module 120 may then modify the color uniformity instructions of the printing module 105 based on the one or more clear color signals generated by the processing unit 115.

When printing systems with in-line scanners are used, this process may provide the local noise, because noise has a local component. This noise may then be reduced from the color signal. This way, accurate measurement of the color using an in-line scanner may be achieved. Furthermore, the in-line scanner's noise may differ from one scan to the other. That is because not only the scanner electronics may be influencing the noise but also the substrate movement, substrate type, press condition, etc. As noise attributed to the scanner may not be assumed as constant it may need to be measured every time a calibration process is required.

Figure 3:
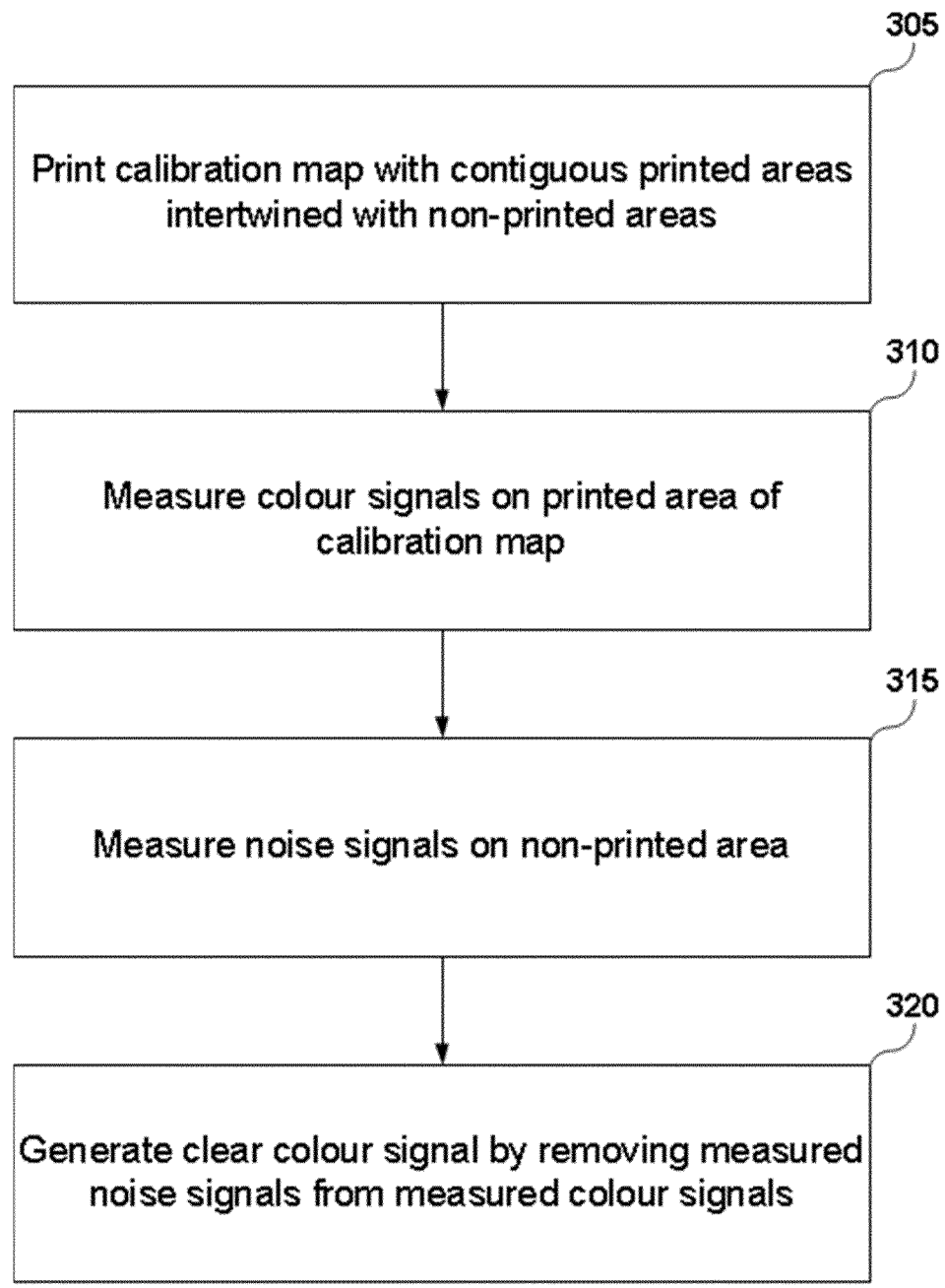
FIG. 3 is a flow diagram for a method for measuring color according to an implementation.

FIG. 3 is a flow diagram for a method of measuring color according to an implementation. A calibration map may be printed on a print medium in block 305. The calibration map may have one or more contiguous printed areas intertwined with non-printed areas, such as the ones depicted with reference to FIG. 2a or 2b. In block 310, one or more color signals may be measured on a first contiguous printed area. In block 315, one or more noise signals may be measured on a non-printed area that is adjacent to the first contiguous printed area. In block 320, a clear color signal may be generated by removing the one or more measured noise signals from the one or more measured color signals.

Measuring one or more color signals may comprise collecting a color value for a plurality of points of the first printed area. Accordingly, measuring one or more noise signals may comprise collecting a noise value for one or more points of the non-printed area that is adjacent to the first contiguous printed area. In case the contiguous areas are lines, the points of the non-printed area used to measure noise may be substantially along the same line, perpendicular to the printed lines, so that they may be measured using the same scanner sensor. The size and shape of the areas may depend on the substrate and the number of colors that need to be measured. Furthermore, the calibration map may have all areas printed using the same color or each area printed with a different color or some lines with one color and other lines with other colors. Furthermore, the same area may be printed with many colors provided that each single color portion of the area is contiguous and is adjacent to one or more substrate non-printed areas. It is noted that each area may be used to measure noise around itself. Therefore, noise measured around an area may not be used or assumed for another area.

To generate the clear color a printed point of the first contiguous printed area whose color value has been collected may be selected. Then, one or more non-printed points around the selected printed point whose noise value has been collected may be selected. A ratio of a measured non-printed point's noise value to a reference noise value may then be calculated. The reference noise value may be a reference value that depends on the substrate. For example, in case the substrate is white, the reference value may be a perfect white color value. This ratio may then be multiplied with the measured printed point's color value. The previous measurements and calculations may then be repeated for all the printed points of the first contiguous printed area where color values have been collected.

Figure 4:
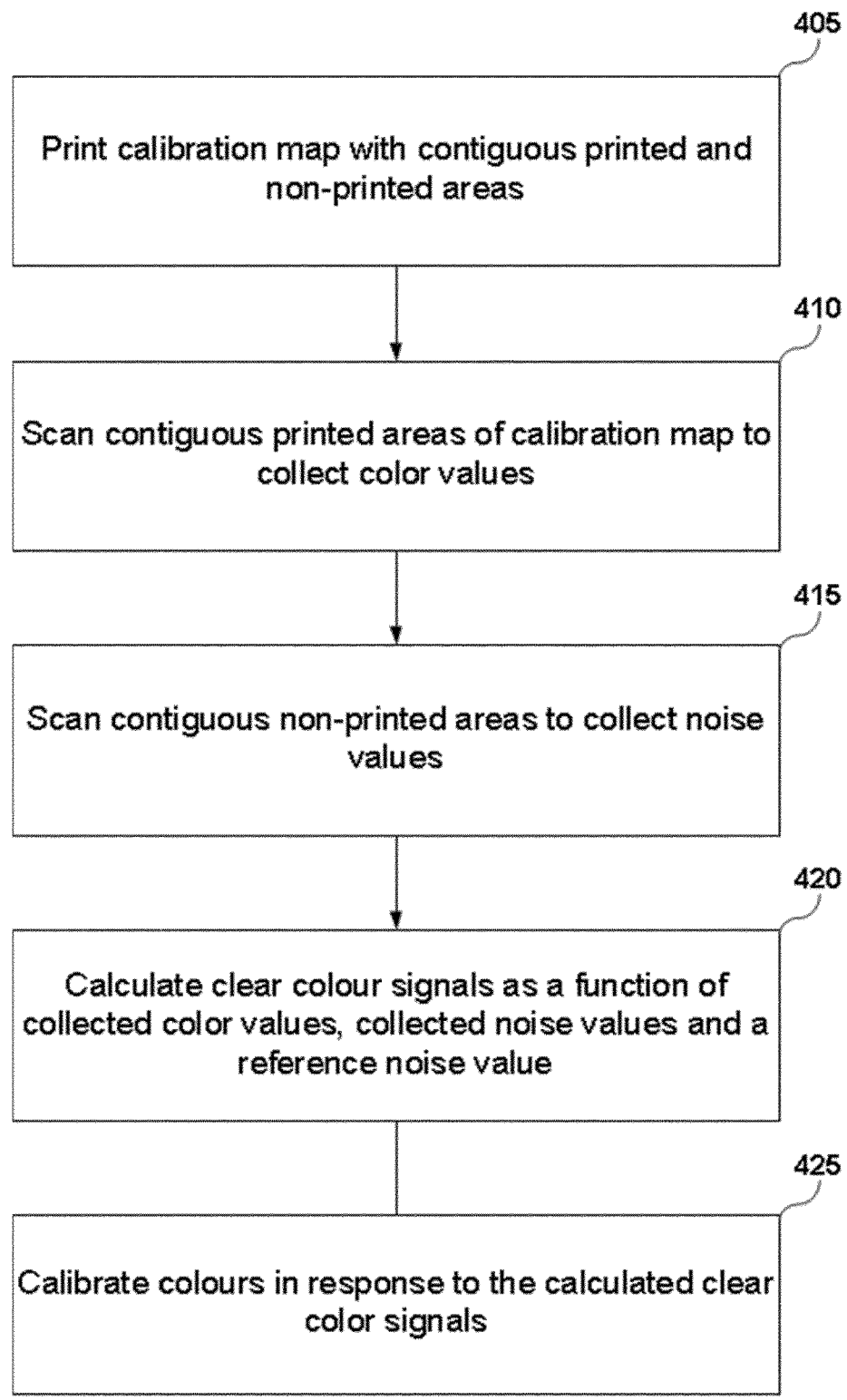
FIG. 4 is flow diagram for a method for calibrating color according to an implementation.

FIG. 4 is flow diagram for a method of calibrating color according to an implementation. In block 405, a calibration map may be printed on a print medium. The calibration map may have intertwined contiguous printed and non-printed areas, such as lines. The printed areas may be printed with one or more colors. In block 410, each contiguous area printed with the same color may be scanned to collect one or more color values, respectively. In block 415, each non-printed area adjacent to each contiguous area may be scanned to collect one or more noise values, respectively. In block 420, one or more clear color signal may be calculated as a function of the collected color values, the collected noise values and a reference noise value, respectively. Then, in block 425, the one or more colors may be calibrated in response to the calculated one or more clear color signals, respectively.

The clear color signal may be calculated by collecting the color value, or RGB value, from all the scanned points of the printed area, e.g. line, removing the noise values measured at points around the scanned points of the printed area, and converting the values to a fourth degree polynomial. The signal, i.e. the fourth degree polynomial, may then be used to calibrate the color along the line path.

When at least two contiguous printed areas are printed with a selected color, then as the print media is moving along the first path A the contiguous printed areas are scanned. Then the clear color signal may be calculated as a function of the collected color values, the collected noise values and a reference noise value for each of the at least two contiguous printed areas.

The uniformity of the selected color along the second path B may be calibrated based on each clear color signal. However, the uniformity of the selected color along the first path A may be calibrated based on a function of the calculated clear color signals. For example, by adjusting the polynomials height based on information from the various calculated polynomials. This way an accurate two-dimensional calibration map may be generated.

In the above mentioned methods, the print medium (i.e. the substrate) may be white and the printed colors that need to be calibrated may be one or more of cyan, a magenta, a yellow, and a black color. However, in other printing systems, e.g. RGB systems, other colors may be used such as red, green and blue as well as other substrate colors, depending on the application.

The invention claimed is:

1. A method of measuring color, comprising:
 printing a calibration map on a print medium, the calibration map having a first contiguous printed area intertwined with a non-printed area;
 measuring one or more color signals on the first contiguous printed area;
 measuring one or more noise signals on the non-printed area;
 generating a clear color signal by removing the one or more measured noise signals from the one or more measured color signals.

2. The method according to claim 1, wherein printing the calibration map comprises printing color lines intertwined with non-printed areas.

3. The method according to claim 1, wherein measuring one or more color signals comprises collecting a color value for a plurality of points of the first contiguous printed area.

4. The method according to claim 3, wherein measuring one or more noise signals comprises collecting a noise value for one or more points of a non-printed area that is adjacent to the first contiguous printed area.

5. The method according to claim 4, wherein generating a clear color signal comprises:
 selecting a printed point of the first contiguous printed area whose color value has been collected;
 selecting one or more non-printed points around the selected printed point whose noise value has been collected;
 calculating a ratio of a non-printed point's noise value to a reference noise value and multiplying the calculated ratio with the printed point's color value;
 repeating the calculation of the ratio for all the printed points of the first contiguous printed area where color values have been collected.

6. The method according to claim 5, wherein the non-printed point noise value is an average of the noise values of the selected one or more non-printed points.

7. The method according to claim 1, wherein printing and measuring are performed by a single printing system.

8. The method of claim 1, wherein the printed area is a line across a print medium movement direction and the non-printed area is an adjacent line across the print medium movement direction.

9. The method of claim 1, wherein the printed area is printed using a combination of differently colored inks.

10. The method of claim 1, wherein noise is assumed to vary and the printing, measuring and generating are repeated.

11. A method for calibrating a printer, comprising:
 printing a calibration map on a print medium, the calibration map having intertwined contiguous printed and non-printed areas, the printed areas printed with one or more colors;
 scanning each contiguous area printed with the same color to collect one or more color values, respectively;
 scanning each non-printed area adjacent to each contiguous area to collect one or more noise values, respectively;
 calculating one or more clear color signal as a function of the collected color values, the collected noise values and a reference noise value, respectively;
 calibrating the one or more colors in response to the calculated one or more clear color signals, respectively.

12. A method according to claim 11, wherein when at least two contiguous printed areas are printed with a selected color, the method comprises:
 moving the print media along a first path;
 scanning the contiguous printed areas along a second path, the first path being substantially perpendicular to the second path;
 calculating a clear color signal as a function of the collected color values, the collected noise values and a reference noise value for each of the at least two contiguous printed areas;
 calibrating the uniformity of the selected color along the second path based on each clear color signal;
 calibrating the uniformity of the selected along the first path based on a function of the calculated clear color signals.

13. A method according to claim 12, wherein the contiguous printed areas are contiguous lines printed along the second path and the contiguous non-printed areas are spaces between the printed lines.

14. A method according to claim 13, wherein:
 a contiguous line comprises one contiguous area;
 color values are collected along the second path of the contiguous line; and
 noise values are collected before and after the contiguous line along the first path.

15. A method according to claim 13, wherein:
 a contiguous line comprises contiguous areas printed with different colors;
 color values are collected along the second path of the contiguous line for each contiguous area; and
 noise values are collected before and after each contiguous area of the contiguous line along the first path.

16. A method according to claim 11, wherein the print media is white and the printed areas are printed with one or more of a cyan, a magenta, a yellow, and a black color.

17. A method according to claim 11, wherein the print media is white and the printed areas are printed with one or more of a red, a green, a blue, and a black color.

18. A print system comprising:
 a printing module to print a calibration map on a print medium based on initial color uniformity instructions, the calibration map having intertwined contiguous printed and non-printed areas;
 an inline image capture assembly to measure one or more color signals on the contiguous printed areas of the calibration map and one or more noise signals on the non-printed areas adjacent to the contiguous printed area of the calibration map;
 a processing unit to receive the one or more color signals and the one or more noise signals and generate one or more clear color signals by removing the one or more measured noise signals from the one or more measured color signals, respectively;

a calibration module to modify the color uniformity instructions of the printing module based on the one or more clear color signals generated by the processing unit.

19. The print system of claim 18, wherein the processing unit is to calculate a ratio of a measured noise value to a reference noise value and multiplying the calculated ratio with the color value of a printed point to correct that color value for noise.

20. The print system of claim 18, wherein the processing unit is to average noise measurements from different non-printed points.

* * * * *